United States Patent [19]

Vollmer

[11] Patent Number: 5,318,145
[45] Date of Patent: Jun. 7, 1994

[54] SIDE WINDOW SAFETY DEVICE FOR A MOTOR VEHICLE

[75] Inventor: Elmar Vollmer, Wettstetten, Fed. Rep. of Germany

[73] Assignee: Audi AG, Ingolstadt, Fed. Rep. of Germany

[21] Appl. No.: 946,324

[22] PCT Filed: Apr. 26, 1991

[86] PCT No.: PCT/EP91/00805
§ 371 Date: Nov. 5, 1992
§ 102(e) Date: Nov. 5, 1992

[87] PCT Pub. No.: WO91/17907
PCT Pub. Date: Nov. 28, 1991

[30] Foreign Application Priority Data

May 23, 1990 [DE] Fed. Rep. of Germany ....... 4016611

[51] Int. Cl.$^5$ .............................................. B60R 21/00
[52] U.S. Cl. ................................. 180/274; 296/200; 280/730 A; 49/141
[58] Field of Search ................. 180/271, 274, 282; 280/728, 730 R, 730 A, 734, 735, 738, 739; 244/129.3; 49/141; 200/61.44; 296/84.1, 209

[56] References Cited

U.S. PATENT DOCUMENTS

| | | | |
|---|---|---|---|
| 2,153,896 | 4/1939 | Mohar | 200/61.44 |
| 2,876,688 | 3/1959 | Laue | 200/61.44 |
| 3,737,193 | 6/1973 | Cain | 49/141 |
| 3,741,583 | 6/1973 | Usui et al. | 180/271 |
| 4,333,381 | 6/1982 | Boeglin et al. | 49/141 |
| 4,643,944 | 2/1987 | Agethen et al. | 180/271 |
| 4,657,105 | 4/1987 | Miyada | 280/749 |
| 4,966,388 | 10/1990 | Warner et al. | 280/730 A |
| 4,977,388 | 12/1990 | Park | 200/61.44 |
| 5,112,079 | 5/1992 | Haland | 280/730 A |

FOREIGN PATENT DOCUMENTS

| | | | |
|---|---|---|---|
| 2028550 | 12/1971 | Fed. Rep. of Germany | B60R 21/02 |
| 2352358 | 5/1974 | Fed. Rep. of Germany | 280/739 |
| 3312769 | 10/1984 | Fed. Rep. of Germany | B60R 21/10 |
| 3422263 | 12/1985 | Fed. Rep. of Germany | B60R 21/16 |
| 3716168 | 11/1988 | Fed. Rep. of Germany | B60R 21/32 |
| 3729021 | 3/1989 | Fed. Rep. of Germany | B60R 22/00 |
| 2-88341 | 3/1990 | Japan | |

OTHER PUBLICATIONS

Research Disclosure, No. 268, "Windshield Release System", disclosure No. 26846, Aug. 1986, p. 474.

*Primary Examiner*—Karin L. Tyson
*Attorney, Agent, or Firm*—Jacques M. Dulin; Thomas C. Feix

[57] ABSTRACT

A safety device in a motor vehicle having side windows fabricated from toughened laminated safety glass with an intermediate plastic film layer. The safety device includes a sensor device for detecting a side collision, and a window striker device for breaking a side window, which striker is activated by an appropriate signal generated by the side collision detecting means. In its broken condition, the window provides a yielding, flexible surface for cushioning the impact of a passenger's head. In various embodiments of the invention, the striker device may be actuated mechanically, or electrically by use of a pyro-technic charge. The side collision detection means is an elongated, fluid filled sensor chamber disposed in a side region of a vehicle. In one embodiment, the fluid filled chamber is contained hidden within an external door guide or bumper. In a second embodiment, the fluid filled chamber is disposed internal of the door body to prevent incidental triggering. During a side collision of the appropriate severity and extent, the fluid filled chamber becomes sufficiently deformed, creating a rise in fluid pressure, which is detected as a signal to make an electric switching contact or to actuate the striker device directly.

16 Claims, 2 Drawing Sheets

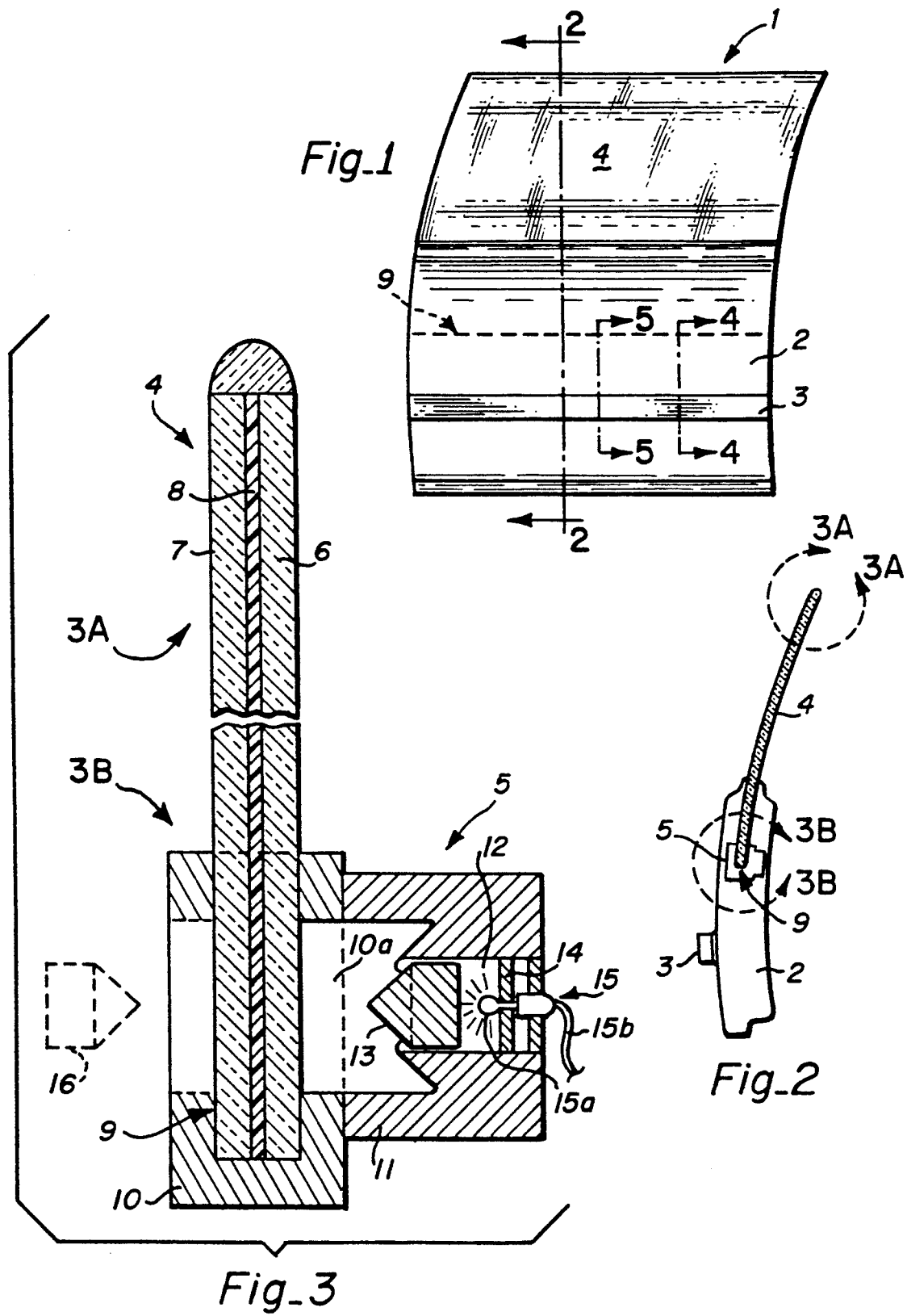

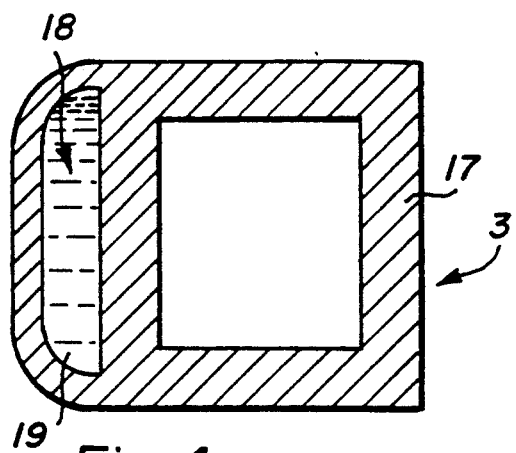
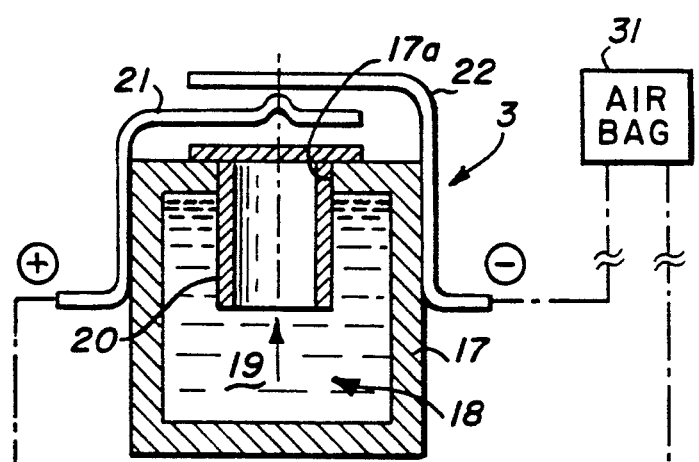
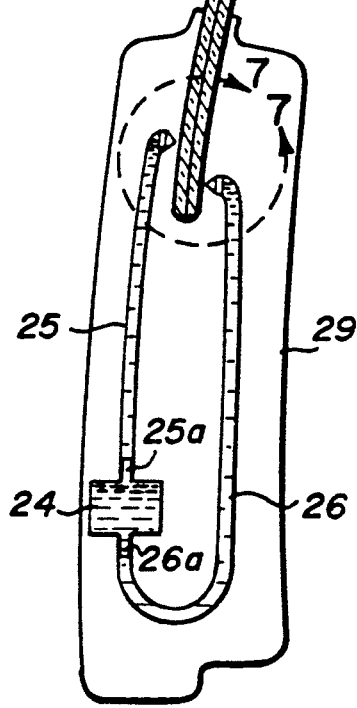
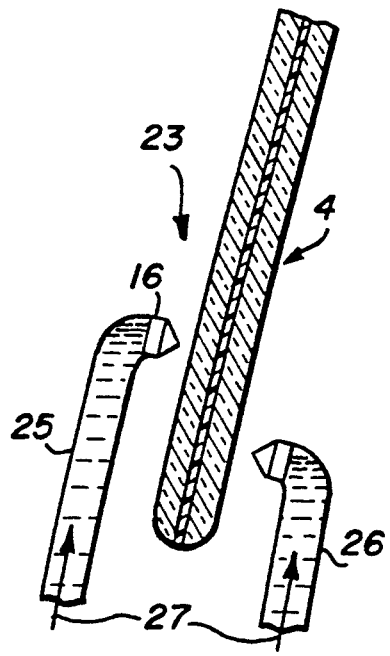

SIDE WINDOW SAFETY DEVICE FOR A MOTOR VEHICLE

FIELD

The invention relates generally to a motor vehicle safety apparatus and method for instantaneously breaking a vehicle side window during side "T-type" collisions to soften the impact of a passenger's head against the vehicle side window. The side window is fabricated as a glass laminate having a high energy-absorbing intermediate plastic layer so that when broken, it provides a yielding, flexible cushion for receiving a passenger's head.

BACKGROUND

It is well known in the area of motor vehicle safety to provide a motor vehicle with an inflatable air bag deployment system which is activated by acceleration sensors in order to protect against the frontal impact of a driver or passenger against the steering and/or dashboard area of the vehicle in the event of an accident of the appropriate severity, particularly head-on collisions. Inflatable air bags are particularly beneficial in reducing head and chest injury since the air cushion offered by the inflated air bag stops a fast moving passenger in a soft, resilient and relatively recoil free manner.

These known types of inflatable air bag deployment systems are typically limited to implementation in the steering wheel or dashboard area of a motor vehicle. Accordingly, their safety benefits are only realized in the event of a front end collision.

For side collisions, the typical driver's side and/or passenger's side airbag does not provide adequate protection for passenger head impact against a side window. Thus, substantial head injuries may be incurred since the safety glass of the side window normally does not break by a blunt head impact and instead remains as a rigid, non-yielding wall. Accordingly, it is desirable to provide a means for protecting the passenger's head from harmful impact against a side window during a side collision.

It is known in the art to open an emergency exit for vehicle passengers by breaking a safety glass pane of a vehicle. For example, railroad cars and buses are often equipped with specially adapted safety hammers which are placed in tear-off holders adjacent to a window pane region for window egress in the event of an emergency. However, in view of the need for manual intervention by the user, it is clearly evident that these safety hammers do not permit the quick, near instantaneous breaking of a window prior to head impact during a side collision.

It is also known in the art to mount an explosive charge adjacent a front windscreen frame member of a motor vehicle and whereby the explosive charge is detonated to release outward or pop open the windshield from its frame member during an impact of the appropriate severity. In this way the passenger's head is prevented from impacting the front windshield. The explosive charge is controlled by electric switch operation and is connected in series with the vehicle battery.

While blasting away the front windshield may be an effective way to prevent a passenger's head from front windshield impact, the problems of head recoil and neck whiplash are still present. Moreover, it is not desirable in all instances to totally remove the windshield as it provides a shield against otherwise unobstructed entryway for flying objects, fire, smoke, gas or harmful vapors which may result during a vehicle collision.

Accordingly, there is an urgent need in the art for a motor vehicle safety device for protecting a passenger's head against harmful side window impact during a side collision, or sufficiently violent oblique collisions which result in the passenger(s) being tossed around inside the car and in that random movement striking the side window(s). There is a need for a safety device which breaks a vehicle side window during a side collision in a controlled manner to provide a soft, resilient cushion for a passenger's head so that the risk of head injury is substantially reduced. Finally, there is a need for such a safety device which is of low cost to manufacture and is easily implemented in existing vehicle designs.

THE INVENTION

Objects

It is among the objects of the present invention to provide a safety device in a motor vehicle which causes a vehicle side window to fracture instantaneously with the event of a side collision of the appropriate severity so that the broken side window provides a flexible, soft surface for catching the passenger's head.

It is another object of the invention to provide a safety device wherein the side windows are fabricated of toughened laminated safety glass having an intermediate plastic film layer which provides pliable structural support to the laminated safety glass when the glass layers are broken.

It is another object of the invention to provide a safety device which includes sensor means fitted within the vehicle for ascertaining a side collision and wherein the sensor means are linked to a striker device disposed adjacent one side window and which is tensioned to provide a definite window breaking strike when activated by the sensor means.

It is another object of the invention to provide a safety device wherein the sensor means includes a fluid-filled sensor chamber arranged in the side region of the motor vehicle body and wherein the sensor means detects a side collision of the appropriate severity by measuring a rise in the sensor chamber fluid pressure.

It is another object of the invention to provide a safety device wherein the window striker device is secured to a movable side window in order to follow the vertical movement path of the window so that the striker device remains in a window breaking position at all times.

It is another object of the invention to provide a side window striker device which is mechanically activated by a sensor means.

It is yet another object of the invention to provide a motor vehicle safety device wherein the side window striker device is electrically activated.

Still other objects will be evident from the following drawings, specification and claims.

DRAWINGS

FIG. 1 is a schematic side elevation view of a motor vehicle side door showing the location of the bumper and side-on collision sensor on the vehicle door.

FIG. 2 is a cross section view of a vehicle side door taken along the line and in the direction of arrows 2—2 of FIG. 1.

FIG. 3 is a breakaway, enlarged cross section view of the door highlighting the bounded regions 3B and 3A of FIG. 2 wherein the upper bounded region 3A illustrates the detail of the preferred window construction and the lower bounded region 3B shows one embodiment of the window striker device.

FIG. 4 is an enlarged cross section view of one embodiment for a bumper showing a sensor chamber arranged therein taken along the line and in the direction of arrows 4—4 of FIG. 1.

FIG. 5 is an enlarged cross section view of an alternate embodiment for a bumper having an expansion element and electrical contact switch taken along the line and in the direction of arrows 5—5 of FIG. 1.

FIG. 6 is a cross section view of a vehicle side door showing an alternate embodiment of a mechanically operated window striker device showing direct hydraulic actuation.

FIG. 7 is an enlarged view of the bounded region of FIG. 6 showing the detail of the direct hydraulic window striker operation.

SUMMARY

The invention comprises a motor vehicle safety device for instantaneously breaking a vehicle side window during a side-on collision. In its broken condition, the window provides a soft, resilient cushion which in effect lessens the harmful impact of a passenger's head thereagainst. In a preferred embodiment, the invention comprises a side collision detection means and a window striking device. The window striking device is activated by the side collision detection means, and is tensioned to provide a definite strike to the window resulting in a complete breakage of the window.

This collision detection process, along with the fracturing of the glass, is so quick that the glass is already broken before a passenger's head strikes against it. In its broken condition, the side window is no longer a rigid wall, but rather a yielding substance. The invention is intended for use in combination with a side window constructed of laminated safety glass of the kind having an inserted intermediate plastic film layer. When the glass portions of the window are broken, the film layer maintains the general shape of the window so as to provide a yielding surface for receiving the passenger's head without jagged exposed edges.

The degree of flexibility or "give" of the broken window and, thus, the level of deceleration of head impact can be optimized by the configuration and dimensioning of the intermediate plastic film layer of the laminated safety glass. The tension (amount) of the striking force of the window striking device is, accordingly, adjusted to account for the number and arrangement of glass layers to be broken in the laminated safety glass provided.

The intentional conversion of the above described laminated safety glass to a broken state during a side collision provides a yielding area for head impact and thus reduces the risk of injury.

In one embodiment of the invention, the striker device is permanently attached to a bottom portion of the window such that it remains within the door body at all times. In this way, the striker device follows the window, and in case of a movable window, remains in an appropriate window striking location at all times. Alternately, the window striking device may be positioned permanently within the door body adjacent to a window guide region.

The window striking device is preferably configured as a bolt firing tool which may be electrically or mechanically activated. In an electrically activated embodiment for the window striker device, the bolt firing tool includes a housing having borehole directed towards the window and wherein a pointed bolt piece is fitted and adapted to shoot out of the bore hole towards the window. For this purpose, a pyro-technic charge having a primer is affixed to an opposite end of the bore-hole provided in the striker device housing, such that when the primer is ignited, the pyro-technic charge explodes and sends the bolt firing piece with sufficient velocity to break the window.

For this embodiment, the side collision detection means comprises a fluid filled chamber disposed within an external bumper arranged on the outside portion of the motor vehicle body and coordinate with the longitudinal axis of the motor vehicle body. Preferably, the bumper is disposed in a region of most probable side impact. The fluid filled sensor chamber is closed at both ends and is provided with an expansion element, preferably a hydraulic piston, which is disposed to move a first electrical contact into engagement with a second electrical contact to complete a circuit for activating the pyrotechnic charge. In operation, deformation of the bumper during a collision causes a reduction in the sensor chamber volume. The resultant increase in fluid pressure forces the piston to extend outwardly from the chamber to move the electrical contacts together and complete the circuit. For this embodiment, a conventional air bag may also be triggered, if desired.

In another embodiment, a striker device is mechanically activated by the fluid filled sensor side collision detection means. Rigid lever transmissions or cable controls may be used as tensioning members (force transmitting or triggering members) for a striking device. However, in the preferred embodiment for mechanical operation, the window striking device, consist of one or more bolt firing pieces loosely fitted to distal ends of one or more hydraulic lines, each of which are oriented to face a desired portion of the side window. Each hydraulic line is connected to a fluid filled sensor chamber by an appropriate hydraulic fitting. In operation, deformation of the fluid-filled sensor results in fluid pressure increase (as described above) and causes each bolt piece to shoot abruptly outwards from the distal end of its associated hydraulic line and thus break the window.

In an alternative embodiment for direct hydraulic actuation of the striking means, the fluid filled sensor is arranged along the longitudinal axis of the motor vehicle, but is disposed internal of the door body (and front and rear fenders, if desired) in an area of possible impact. In the event of a side collision, the sensor chamber is compressed and the reduction in volume increases pressure in the fluid which is detected as a signal. This signal may be used in combination with the expansion element to generate electric contact for the pyro-technically activated window striking device or may be used in combination with the all hydraulic actuation for the bolt-firing device.

For the embodiments wherein the sensor chamber is formed as part of a external bumper, it is desired to provide the bumper with a particular strength and a predetermined response to bending. The bumper may be fashioned as a conventional door bumper which is used for ram protection or may be provided inside the door body.

DETAILED DESCRIPTION OF THE BEST MODE

The following detailed description illustrates the invention by way of example, not by way of limitation of the principles of the invention. This description will clearly enable one skilled in the art to make and use the invention, and describes several embodiments, adaptations, variations, alternatives and uses of the invention, including what I presently believe is the best mode of carrying out the invention.

FIG. 1 is a side elevation view of a motor vehicle door indicated generally by the reference numeral 1. The motor vehicle door 1 shown here includes a door body 2 and a side window 4. The door body 2 includes an exterior mounted, outwardly projecting door guide strip arranged as a bumper 3. The side window 4 moves vertically up and down within a conventional guide (not shown) provided in the door body 2 and operates in the known way. The side window 4 is shown in its upper, closed position having its lower or bottom end portion 9 (shown in phantom) protruding a distance within the door body 2.

FIG. 2 shows a cross-section view of the door body 2, the bumper 3 and the side window 4. In one embodiment of the invention, striker device 5 is attached to the bottom end portion 9 of side window 4. This is indicated generally at lower bounded region 3B of FIG. 2. The striker device 5 is used for breaking the side window 4 during a side collision so that the broken window acts to cushion the impact of a passenger's head against the window 4.

FIG. 3 is a breakaway, enlarged cross-section view of the door shown in FIG. 2 highlighting the upper and lower bounded regions 3B and 3A, respectively. The construction of a laminated safety glass pane is shown as having a first inner glass layer 6 and a second outer glass layer 7. The glass layers 6 and 7 are adhesively joined together by means of an intermediate plastic film layer 8. The laminated safety glass is preferably tempered such that the glass layers 6 and 7 break into small individual pieces when acted upon by the striker device 5. When broken, the individual glass shards or fragments of glass layers 6 and 7 are held together by the intermediate plastic film layer 8 to form a yielding surface.

One embodiment for a window mounted striker device 5 is shown in the enlarged view of bounded region 3B of FIG. 3. In this embodiment, the striker device 5 includes a connecting element 10 to permit attachment or mounting to the window 4 at a location preferably at or near the window bottom end portion 9 as shown. Permanent fixation in this fashion permits the striker device to remain in a constant physical location with respect to the bottom end portion 9 of the window as it moves through its up and down range of movement so that the striker device when activated breaks the window in a predictable fashion irrespective of the vertical positioning of a movable window i.e., whether the window is open or closed.

A housing 11, preferably formed as a metal body, is attached to connection element 10. The housing 11 includes a central borehole 12 oriented towards a side surface of the window adjacent a bottom edge 9 and co-aligned with opening 10a in the connection element 10. At its window facing end, the bore hole 12 is fitted with a projectile or bolt piece 13 having a projecting conical tip oriented towards the window. The other end of the bore hole 12 is sealed off by a plate 14, and carries a pyrotechnic charge 15 having a primer 15a disposed inside the bore hole 12 through which the ignition wire 15b is conducted. Hence, in this embodiment the striker device 5 is fashioned as a bolt firing tool. Detonation of the pyrotechnic charge 15 causes the bolt piece 13 to fire at great velocity towards the window bottom edge 9. This results in fracture of the entire window 4.

While the FIG. 3 embodiment shows the striker device 5 attached to the window adjacent the bottom edge portion 9, such that the bolt piece or projectile 13 hits the inward facing glass layer 6 first, it is understood that striker device may also be arranged in a reverse orientation along the window such that the projectile 13 contacts the outer glass layer 7 first.

In an alternate embodiment, the bolt firing device may be mounted in the door body 2 rather than fixed to the window 4. This arrangement may be of particular use, for example, in the case of a non-movable window. An example of an alternate embodiment of a stationary arrangement for the bolt firing tool is shown by the phantom schematic representation of bolt piece or projectile 16 on the left side (outward facing direction) of window 4 in FIG. 3.

FIG. 5 shows one embodiment for an electrically activated side-on collision sensor of the present invention. In FIG. 5, a cross section view of an extended door bumper 3 taken along the line and in the direction of arrows 5—5 of FIG. 1 is shown. Bumper 3 is preferably formed as an extended profile in the shape of a four-sided tube 17 defining a sensor chamber 18. This sensor chamber preferably extends the length of the motor vehicle longitudinal axis and is positioned horizontally along the outer motor vehicle door side panels and fender portions. For this purpose, the chamber, enclosed by the external bumper 3, is provided to both sides of the motor vehicle chassis for ram protection at regions of most probable side impact.

The sensor chamber 18 is closed or otherwise sealed at both ends and is filled with a fluid 19. The preferred fluid is an incompressible fluid which does not freeze and which exhibits little or no response to changes in the outside ambient temperature, such as ethylene glycol-type antifreeze.

The sensor chamber 18 is provided with an expansion element, preferably a hydraulic piston 20, and is fitted tightly within a receiving hole 17a provided on a side surface of the four-sided tube 17 as shown. The hydraulic piston 20 is shown in the fully retracted position. During expansion (i.e., outward extension from the chamber 18), the piston head moves a first, lower electrical contact 21 into engagement with a second, upper electrical contact 22.

The sensor device shown in FIG. 5 accomplishes the following function. In event of a severe side-on collision, the walls 17 of the tubular sensor chamber 18 becomes indented or otherwise deformed so that the fluid 19 is displaced. The resulting increase in fluid pressure acts on the hydraulic piston 20 forcing it out from the sensor chamber 18 to impinge on the first lower electric contact 21 which, in turn, moves upward to make contact with the second upper electric contact 22. This closes a circuit which includes the primer 15 of FIG. 3 (not shown). The closed circuit ignites the primer 15 causing the bolt piece 13 to shot out from the bore hole 12 with its pointed tip against the window bottom edge portion 9 causing the side window 4 to break. All of these processes transpire very quickly, so that the side window is broken before the passenger's head is caught in a yielding, recoil free way. The desired cushioning effect for the broken window can be varied depending on the construction (plastic material and thickness) of the intermediate film layer 8.

It should be understood that the piston 20 is very tightly fitted in hole 17a so that incidental contact or vandalism does not trigger the glass breakage.

FIGS. 4, 6 and 7 disclose alternate embodiments of the present invention wherein both the side-on collision sensor and the window striker device are mechanically activated.

Referring to FIG. 6., a first alternate embodiment for an all mechanical system is shown. As before a side bumper 24 is provided, however, in this embodiment the bumper 24 is disposed inside the door body 29. As before, bumper 24 (formed as a sensor chamber) extends lengthwise along the door body 29 (continuing along the front and rear fenders if desired) and is entirely filled with hydraulic fluid. Two hose connection pieces 25a, 26a are provided to the bumper for joining to hydraulic lines 25 and 26. The hydraulic lines 25, 26 each terminate at opposite sides of the side window 4 and are here fixed inside the door body 29 so that their distal ends remain within a desired distance of the window.

In the enlarged representation of FIG. 7, it is seen that the distal ends of the hydraulic lines 25, 26 are plugged closed with pointed tip bolt pieces 16.

The mechanically actuated embodiment of FIGS. 6-7 has the following function. Upon a side collision of the appropriate severity, the door or fender body 29 and the fluid-filled bumper 24 disposed therein become deformed. Thus, the bumper 24 also acts as sensor chamber from which fluid is displaced into the hydraulic lines 25, 26 creating a rise in fluid pressure. At a predetermined pressure increase, the bolt pieces 16 explode outwards from the distal ends of the hydraulic lines 25, 26 and are directed to shoot against the lower edge of the side window 4. Once again, the side window 4 is shattered by the impact and the previously described safety advantages are accomplished for a passenger. Thus in view of the above disclosure, an simple and reliable all-mechanical system may be realized very inexpensively. In addition, in the preferred location embodiment, since the bumper/sensor/pressure chamber 24 is hidden within the door or fender, incidental contact or vandalism will not trigger glass breakage.

Referring to FIG. 4, an alternate arrangement for a mechanically activated side collision sensor is shown in FIG. 4, a cross section view of the door bumper 3 taken along the line and in the direction of arrows 4—4 of FIG. 1. As before with reference to the embodiment of FIG. 5, Bumper 3 is preferably formed as an extruded profile in the shape of a four-sided tube 17 except now a fluid-filled sensor chamber 18 is also provided and is formed adjacent the outward facing wall as viewed in lengthwise direction of the long axis of the motor vehicle. The sensor chamber 18 is closed at its ends and is filled with a fluid 19.

The sensor chamber 18 of FIG. 4 may be provided with hydraulic line fittings as shown in FIG. 6 to form an all mechanical system. Alternatively, the fluid filled sensor chamber 18 of FIG. 4 may be combined with the external fluid-filled and electrically activated side-on collision sensor chamber arrangement shown in FIG. 5.

It should be understood that various modifications within the scope of this invention can be made by one of ordinary skill in the art without departing from the spirit thereof. For example, while the fluid-filled sensor chambers of the FIGS. 4-7 embodiments are represented as four-sided tube structures, it is understood that the sensor chamber need not be limited to such configurations, but may also include circle, oval cross sections or other cross-sections if desired.

Also, while the invention is primarily directed to instantaneous breaking of a side window during a side collision to lessen head impact, it is also understood that the sensor means and window striker means may also be implemented in combination with front on collision protection safety systems. Moreover, conventional collision sensors, such as, for example acceleration sensors of the kind used in airbag deployment systems, may be substituted for the fluid-filled sensor chambers of the present invention. Further, and especially in view of the electrically activated bolt firing tool striker device disclosed in FIGS. 3 and 5, an airbag 31 (See FIG. 5) may also included in the electric circuit, the crash-activation of which causes the airbag to inflate during a triggering event. I therefore wish my invention to be defined by the scope of the appended claims as broadly as the prior art will permit, and in view of the specification if need be.

| PARTS LIST | | | |
|---|---|---|---|
| 1. | Door | 21. | Lower Electric Contact |
| 2. | Door Body | 22. | Upper Electric Contact |
| 3. | Bumper (Auto Trim- Door Guide Strip) | 23. | Striker Device Alternate Embodiment |
| 4. | Side Window | 24. | Bumper |
| 5. | Striker Device | 25 | Hydraulic Line |
| 6. | Glass Layer (inside) | 26. | Hydraulic Line |
| 7. | Glass Layer (outside) | 29. | Door Body |
| 8. | Intermediate Plastic Foil (film) | | |
| 9. | Window Bottom End Portion | | |
| 10. | Connection Element | | |
| 10a. | Connection Element Opening | | |
| 11. | Striker Housing (metal) | | |
| 12. | Bore | | |
| 13. | Bolt Piece (bolt member) | | |
| 14. | Plate (end) | | |
| 15. | Primer | | |
| 16. | Bolt Piece | | |
| 17. | Four Sided Pipe | | |
| 17a. | Receiving Hole | | |
| 18. | Sensor Chamber | | |
| 19. | Fluid | | |
| 20. | Expansion Element (hydraulic piston) | | |

I claim:

1. A safety device for reducing passenger head impact injury resulting from side collisions in a motor vehicle comprising in operative combination:
   a) at least one laminated safety glass side window having at least one intermediate plastic film layer disposed between surrounding glass layers;
   b) means for detecting a side collision of a predetermined severity; and
   c) striking means responsive to said detecting means for converting said side window from a rigid surface to a yieldingly, flexible surface for receiving a passenger's head when impacted thereagainst said striking means being disposed adjacent an edge of said side window.

2. A safety device for a motor vehicle as in claim 1 wherein said side collision detecting means includes:

a) a fluid-filled sensor chamber disposed along a side portion of said motor vehicle in a region of probable impact.

3. A safety device for a motor vehicle as in claim 2 wherein said window striking means is a mechanical system which includes:
   a) at least one hydraulic line having a first end communicatively coupled to said sensor chamber and a second end disposed adjacent said window; and
   b) a bolt firing tool disposed in actuating communication with said hydraulic line second end, said bolt firing tool operative to fire from said hydraulic line second end and break said window when said sensor chamber experiences an internal fluid pressure increase in response to a side collision of a predetermined severity.

4. A safety device for a motor vehicle as in claim 3 wherein said sensor chamber is disposed internal of a vehicle side door body.

5. A safety device for a motor vehicle as in claim 3 wherein said sensor chamber is disposed within a bumper molding provided along an outer side body portion of said motor vehicle.

6. A safety device for a motor vehicle as in claim 2 wherein fluid contained within said sensor chamber is freeze resistant.

7. A safety device for a motor vehicle as in claim 2 wherein:
   a) said side collision detection means further includes means for converting a change in internal fluid pressure of said sensor chamber into an electrical signal; and
   b) said window striking means comprises an electrically operated system and includes:
      i) at least one bolt firing tool disposed facing a portion of said window; and
      ii) an electrically actuated pyrotechnic charge responsive to said detection means and operative to fire said bolt firing tool.

8. A safety device for a motor vehicle as in claim 7 wherein said electrical signal conversion means includes:
   a) an electrical circuit including a pair of electrical contacts for sending a detected collision signal from said collision sensor to said pyrotechnic charge; and
   b) a hydraulic member disposed in communication with said sensor chamber and operative to close said pair of electrical contacts and complete said electrical circuit in response to an increase in internal pressure above a threshold level.

9. A safety device for a motor vehicle as in claim 7 wherein said window striking means is disposed within in a housing connected to said window.

10. A safety device for a motor vehicle as in claim 9 wherein said sensor chamber is disposed within a vehicle side door body.

11. A safety device for a motor vehicle as in claim 9 wherein said sensor chamber is disposed within a bumper molding provided along an outer side body portion of said motor vehicle.

12. A safety device for a motor vehicle as in claim 7 wherein said window striking means is disposed connected to a side door window receiving cavity of said motor vehicle.

13. A safety device for a motor vehicle as in claim 12 wherein said sensor chamber is disposed within a vehicle side door body.

14. A safety device for a motor vehicle as in claim 12 wherein said sensor chamber is disposed within a bumper molding provided along an outer side body portion of said motor vehicle.

15. A safety device for a motor vehicle as in claim 1 wherein:
   a) said side collision detecting means is an acceleration sensor.

16. A safety device for a motor vehicle as in claim 15 which includes:
   a) an inflatable air bag disposed in a passenger compartment region to intercept side head impact upon activation; and
   b) said air bag being activated by said side collision detecting means.

* * * * *